(12) United States Patent
Dai et al.

(10) Patent No.: US 11,302,986 B2
(45) Date of Patent: Apr. 12, 2022

(54) BATTERY MODULE, BATTERY PACK, AND VEHICLE

(71) Applicant: CONTEMPORARY AMPEREX TECHNOLOGY CO., LIMITED, Fujian (CN)

(72) Inventors: Xiaoshan Dai, Fujian (CN); Shoujiang Xu, Fujian (CN)

(73) Assignee: CONTEMPORARY AMPEREX TECHNOLOGY CO., LIMITED, Ningde (CN)

(\*) Notice: Subject to any disclaimer, the term of this patent is extended or adjusted under 35 U.S.C. 154(b) by 0 days.

(21) Appl. No.: 17/489,046

(22) Filed: Sep. 29, 2021

(65) Prior Publication Data

US 2022/0021058 A1 Jan. 20, 2022

Related U.S. Application Data

(63) Continuation of application No. PCT/CN2020/104677, filed on Jul. 25, 2020.

(30) Foreign Application Priority Data

Sep. 20, 2019 (CN) .................. 201921576323.X

(51) Int. Cl.
*H01M 50/209* (2021.01)
*H01M 50/233* (2021.01)
(Continued)

(52) U.S. Cl.
CPC ....... *H01M 50/209* (2021.01); *H01M 50/233* (2021.01); *H01M 50/249* (2021.01); *H01M 50/262* (2021.01); *H01M 2220/20* (2013.01)

(58) Field of Classification Search
CPC ............. H01M 50/209; H01M 50/233; H01M 50/249; H01M 50/262
See application file for complete search history.

(56) References Cited

U.S. PATENT DOCUMENTS

| 8,771,853 B2 | 7/2014 | Ogawa |
| 2004/0065492 A1 | 4/2004 | Ogawa |

(Continued)

FOREIGN PATENT DOCUMENTS

| CN | 207558892 U | 6/2018 |
| CN | 208444873 U | 1/2019 |

(Continued)

OTHER PUBLICATIONS

International Search Report and Written Opinion dated Oct. 28, 2020 received in International Application No. PCT/CN2020/104677.

*Primary Examiner* — Jonathan G Jelsma
(74) *Attorney, Agent, or Firm* — Scully Scott Murphy & Presser

(57) ABSTRACT

This application provides a battery module, a battery pack, and a vehicle. The battery module includes batteries, a first end plate, and a second end plate. A first lug portion of the first end plate is provided with a first mounting hole. A second lug portion of the second end plate is provided with a second mounting hole. An area of a lower surface of the first lug portion is $S_1$, a distance from a central axis of the first mounting hole to a center line of the battery module is $d_1$, an area of a lower surface of the second lug portion is $S_2$ and a distance from a central axis of the second mounting hole to the center line of the battery module is $d_2$, where $d_1 > d_2$, and $S_1 < S_2$.

20 Claims, 5 Drawing Sheets

(51) Int. Cl.
*H01M 50/262* (2021.01)
*H01M 50/249* (2021.01)

(56) References Cited

U.S. PATENT DOCUMENTS

2016/0329538 A1* 11/2016 Hughes .............. H01M 10/052
2020/0006722 A1* 1/2020 Tanner .............. H01M 10/425

FOREIGN PATENT DOCUMENTS

| CN | 208904086 U | | 5/2019 |
| CN | 209071471 U | | 7/2019 |
| CN | 209401684 U | | 9/2019 |
| CN | 210576106 U | | 5/2020 |
| CN | 112397832 A | * | 2/2021 |
| EP | 1406335 B1 | | 2/2013 |

* cited by examiner

BATTERY MODULE, BATTERY PACK, AND VEHICLE

CROSS-REFERENCE TO RELATED APPLICATIONS

This application is a continuation of International Application No. PCT/CN2020/104677, filed on Jul. 25, 2020, which claims priority to Chinese Patent Application No. CN201921576323.X, filed on Sep. 20, 2019. The disclosures of the aforementioned applications are hereby incorporated by reference in their entireties.

TECHNICAL FIELD

This application relates to the technical field of batteries, and in particular, to a battery module, a battery pack, and a vehicle.

BACKGROUND

A battery pack typically includes a box body and a plurality of battery modules fastened in the box body. Each battery module includes a plurality of batteries arranged side by side, and a first end plate and a second end plate respectively arranged at two ends of the plurality of batteries. To fasten each battery module, the first end plate is typically provided with a first lug portion, the second end plate is generally provided with a second lug portion, and the first lug portion and the second lug portion are in staggered arrangement. In other words, a distance from the first lug portion to a center line of the battery module is different from a distance from the second lug portion to the center line of the battery module. Therefore, jointing assembly between adjacent battery modules can be achieved, to save internal mounting space of the battery pack. However, the first lug portion and the second lug portion of the conventional battery module are generally of the same structure. When fastened to the box body, the first lug portion and the second lug portion receive different stresses at their corresponding fastening points due to the staggered arrangement of the first lug portion and the second lug portion. In such case, if structural strength of the fastening points is designed according to the maximum stress at the fastening point, the structural strength at some fastening points tends to be over-designed, reducing energy density of the battery pack.

SUMMARY

In view of the problems in the background, this application is intended to provide a battery module, a battery pack, and a vehicle. When the battery module is used in the battery pack, reliability in connection between the battery module and the box body is guaranteed, and a difference between structural strength at different fastening points is reduced, so that energy density of the battery pack is increased. When the battery pack is used in the vehicle, endurance mileage of the vehicle is greatly increased.

To achieve the foregoing objective, this application provides a battery module, including a plurality of batteries, a first end plate, and a second end plate, where the first end plate and the second end plate are respectively located on two sides of the plurality of batteries in a second direction. The first end plate is provided with a first main body portion and a first lug portion. The first lug portion protrudes from the first main body portion along the second direction, and is provided with a first mounting hole. The second end plate is provided with a second main body portion and a second lug portion. The second lug portion protrudes from the second main body portion along the second direction, and is provided with a second mounting hole. An area of a lower surface, in a third direction, of the first lug portion is $S_1$, a distance from a central axis of the first mounting hole to a center line, in a first direction, of the battery module is $d_1$, an area of a lower surface, in the third direction, of the second lug portion is $S_2$, and a distance from a central axis of the second mounting hole to the center line, in the first direction, of the battery module is $d_2$, where $d_1 > d_2$, and $S_1 < S_2$.

In an embodiment according to this application, $0 \leq |S_1 d_1 - S_2 d_2| \leq 0.05$.

In an embodiment according to this application, the first end plate has a lower edge in the third direction. A height of the first end plate in the third direction is H, and a distance between the first lug portion and the lower edge of the first end plate is h, where $H/4 \leq h \leq H/2$.

In an embodiment according to this application, a first recess face is formed at an end portion of the first lug portion, and the first recess face is recessed to the first main body portion along the second direction.

In an embodiment according to this application, an acute angle formed between a tangent direction of the first recess face and the first direction is $\theta_1$, where $\theta_1 \leq 45°$.

In an embodiment according to this application, the first end plate is further provided with a first reinforcement portion, and the first reinforcement portion is connected to the first main body portion and protrudes from the first main body portion along the second direction. The first lug portion is connected to the first reinforcement portion and protrudes from the first reinforcement portion along the second direction.

In an embodiment according to this application, the first mounting hole and the second mounting hole are kidney-shaped holes, and major axes of the kidney-shaped holes are parallel to the second direction.

In an embodiment according to this application, the first lug portion and the second lug portion are located on the same side of a center line of the battery module in the first direction. The first end plate is further provided with a third lug portion. The third lug portion protrudes from the first main body portion along the second direction, and is provided with a third mounting hole. The third lug portion and the first lug portion are respectively located on two sides of the center line of the battery module in the first direction. The second end plate is further provided with a fourth lug portion. The fourth lug portion protrudes from the second main body portion along the second direction, and is provided with a fourth mounting hole. The fourth lug portion and the second lug portion are respectively located on two sides of the center line of the battery module in the first direction. An area of a lower surface, in the third direction, of the third lug portion is $S_3$, a distance from a central axis of the third mounting hole to a center line, in the first direction, of the first end plate is $d_3$, an area of a lower surface of the fourth lug portion is $S_4$, and a distance from a central axis of the fourth mounting hole to a center line, in the first direction, of the second end plate is $d_4$, where $d_3 < d_4$, and $S_3 > S_4$.

In an embodiment according to this application, $0 \leq |S_3 d_3 - S_1 d_1| \leq 0.05$, and $0 \leq |S_4 d_4 - S_2 d_2| \leq 0.05$.

In an embodiment according to this application, $0 \leq |S_3 d_3 - S_4 d_4| \leq 0.05$.

In an embodiment according to this application, $d_3 = d_2$, and $S_3 = S_2$; and $d_4 = d_1$, and $S_4 = S_1$.

In an embodiment according to this application, a third recess face (113B) is formed at an end portion, in a first direction (X), of a third lug portion (113), and the third recess face (113B) is recessed to a first main body portion (111) along a second direction (Y); and a fourth recess face (123B) is formed at an end portion, in the first direction (X), of a fourth lug portion (123), and the fourth recess face (123B) is recessed to a second main body portion (121) along the second direction (Y).

In an embodiment according to this application, an acute angle formed between a tangent direction of the third recess face (113B) and the first direction (X) is $\theta_3$, where $\theta_3 \leq 45°$; and an acute angle formed between a tangent direction of the fourth recess face (123B) and the first direction (X) is $\theta_4$, where $\theta_4 \leq 45°$.

In another aspect, this application further provides a battery pack, including a box body and a plurality of the battery modules described above. Each battery module is fastened to the box body through a first mounting hole and a second mounting hole. The plurality of battery modules include a first battery module and a second battery module, and a first lug portion of a first end plate of the first battery module and a second lug portion of a second end plate of the second battery module are arranged side by side in a first direction.

This application further provides a battery pack, including a box body and a plurality of the battery modules described above. Each battery module is fastened to the box body through a first mounting hole, a second mounting hole, a third mounting hole, and a fourth mounting hole. The plurality of battery modules include a first battery module and a second battery module, and a first lug portion of the first battery module, a second lug portion of the second battery module, a third lug portion of the first battery module, and a fourth lug portion of the second battery module are sequentially arranged side by side in a first direction.

In an embodiment, the third lug portion of the first battery module and the second lug portion of the second battery module are arranged at an interval in the first direction.

In addition, this application further provides a vehicle, including the battery pack described above, which is used to provide electric power to the vehicle.

Beneficial effects of the technical solutions of this application are as follows:

In an assembling process of the battery pack, because $d_1 > d_2$, for the first battery module and the second battery module adjacently arranged in the second direction, the second lug portion of the second end plate of the first battery module and the first lug portion of the first end plate of the second battery module may be arranged side by side in the first direction, thereby achieving jointing assembly between the adjacent battery modules. This assembly mode reduces a mounting clearance between the adjacent battery modules, thereby increasing a space utilization rate of the battery modules in the box body, and accordingly increasing the energy density of the battery pack. In addition, when two ends of each battery module are respectively fastened to the box body through the first mounting hole and the second mounting hole, because $d_1 > d_2$, to ensure a stress balance between different fastening points, a stress $F_1$ at the fastening point corresponding to the first mounting hole is less than a stress $F_2$ at the fastening point corresponding to the second mounting hole. In such case, because $F_1 < F_2$, and $S_1 < S_2$, a difference between a pressure $P_1$ applied to the first lug portion and a pressure $P_2$ applied to the second lug portion is reduced, and a difference between structural strength of the first lug portion and structural strength of the second lug portion is correspondingly reduced, thereby preventing the structural strength of the first lug portion or the structural strength of the second lug portion from being over-designed. This further increases the energy density of the battery pack, and ensures the fastening reliability between the battery modules and the box body.

DESCRIPTION OF EMBODIMENTS

To make the objectives, technical solutions, and advantages of this application clearer, the following describes this application in detail with reference to accompanying drawings and embodiments. It should be understood that the specific embodiments described herein are merely used to explain this application but are not intended to limit this application.

In the descriptions of this application, unless otherwise specified and defined explicitly, the terms such as "first", "second", and "third" are merely intended for a purpose of description, and should not be understood as any indication or implication of relative importance; the term "plurality of" indicates two or more (including two); and unless otherwise specified and defined explicitly, the terms "connection" and "fastening" should be understood in their general senses. For example, the "connection" may be a fixed connection, a detachable connection, an integrated connection, an electrical connection, or a signal connection; or may be a direct connection, or an indirect connection through an intermediate medium. A person of ordinary skill in the art can understand specific meanings of these terms in this application based on specific situations.

In the descriptions of the specification, it should be understood that the directional terms such as "up" and "down" described in the embodiments of this application are described from angles shown in the accompanying drawings, and should not be understood as a limitation on the embodiments of this application. This application is further described in detail with reference to specific embodiments and accompanying drawings.

A vehicle according to this application includes a vehicle body, a battery pack, and a power source. Both the battery pack and the power source are mounted on the vehicle body, and the battery pack is electrically connected to the power source to supply power to the power source. The vehicle may be a new energy vehicle. In a first embodiment, the new energy vehicle may be a battery electric vehicle, or may be a hybrid electric vehicle or an extended-range electric vehicle. In one embodiment, the battery pack may be horizontally arranged at the bottom of the vehicle body.

Referring to FIG. 1 to FIG. 8, the battery pack includes a plurality of battery modules 1 and a box body 2, and the plurality of battery modules 1 each may be fastened to the box body 2 through corresponding fasteners (such as bolts).

Figure 1:
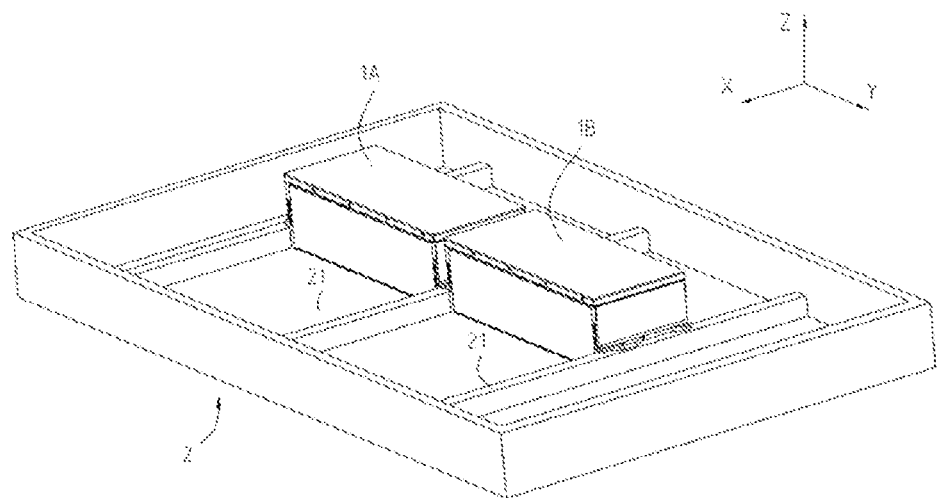
FIG. 1 is a perspective view of a battery pack according to this application, where only a part of battery modules are shown for clarity.
Figure 2:
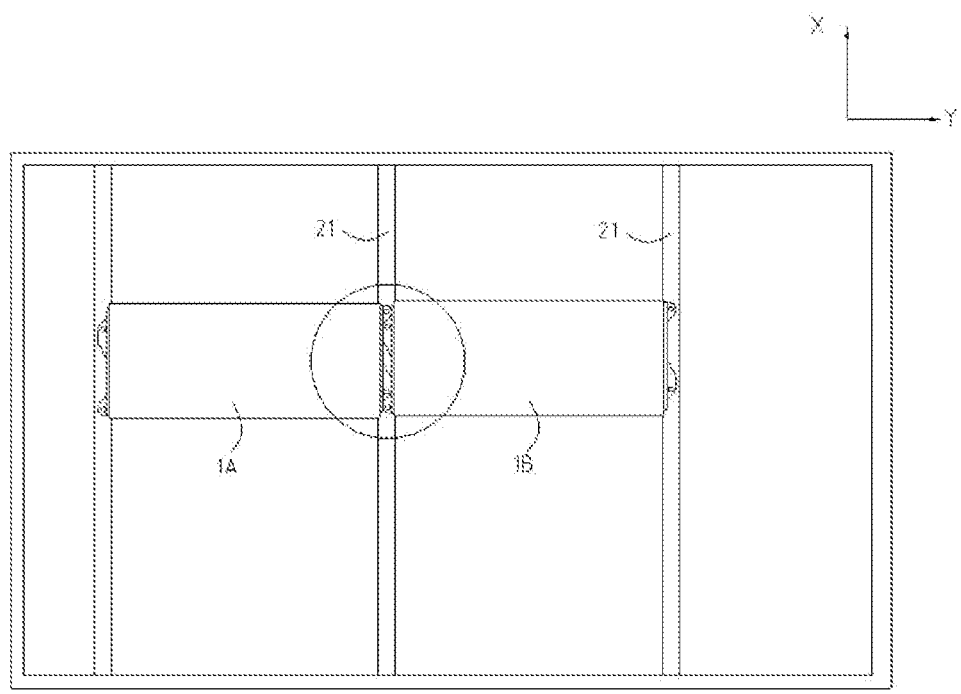
FIG. 2 is a bottom view of FIG. 1.

Referring to FIG. 1 and FIG. 2, the box body 2 may be provided with a plurality of support beams 21. The plurality of support beams 21 are arranged at intervals inside the box body 2. A space between every two adjacent support beams 21 is used to accommodate a corresponding battery module 1.

Figure 3:
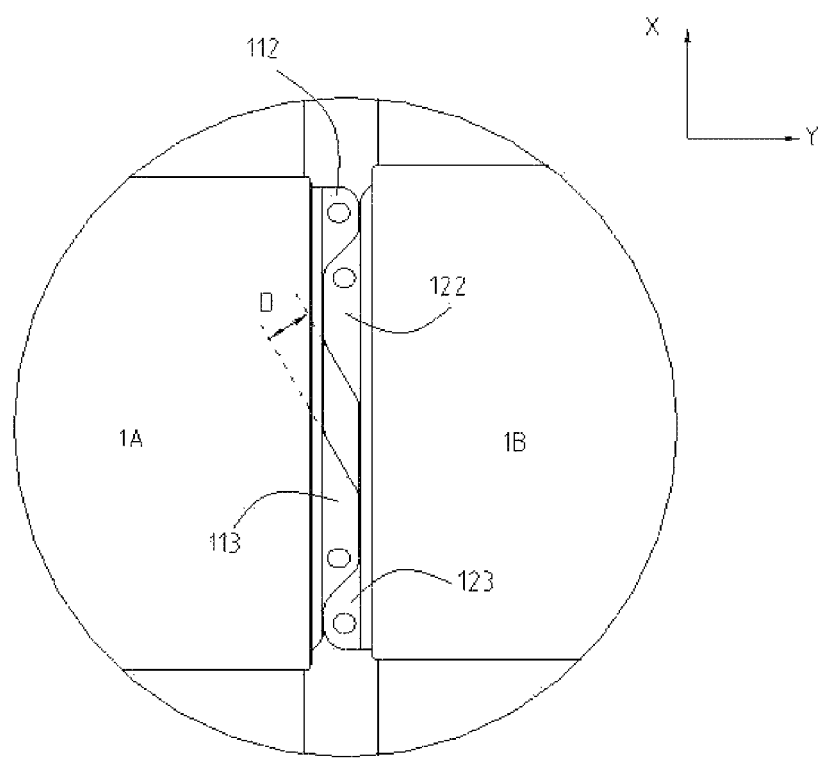
FIG. 3 is an enlarged view of a circled part in FIG. 2.

Referring to FIG. 1 to FIG. 3, each battery module 1 is arranged between two adjacent support beams 21, and is fastened to the two adjacent support beams 21. Two battery modules 1 that are adjacent to each other in a second direction Y include a first battery module 1A and a second battery module 1B. End portions, facing each other, of the first battery module 11A and the second battery module 1B are both fastened to the same support beam 21.

Figure 4:
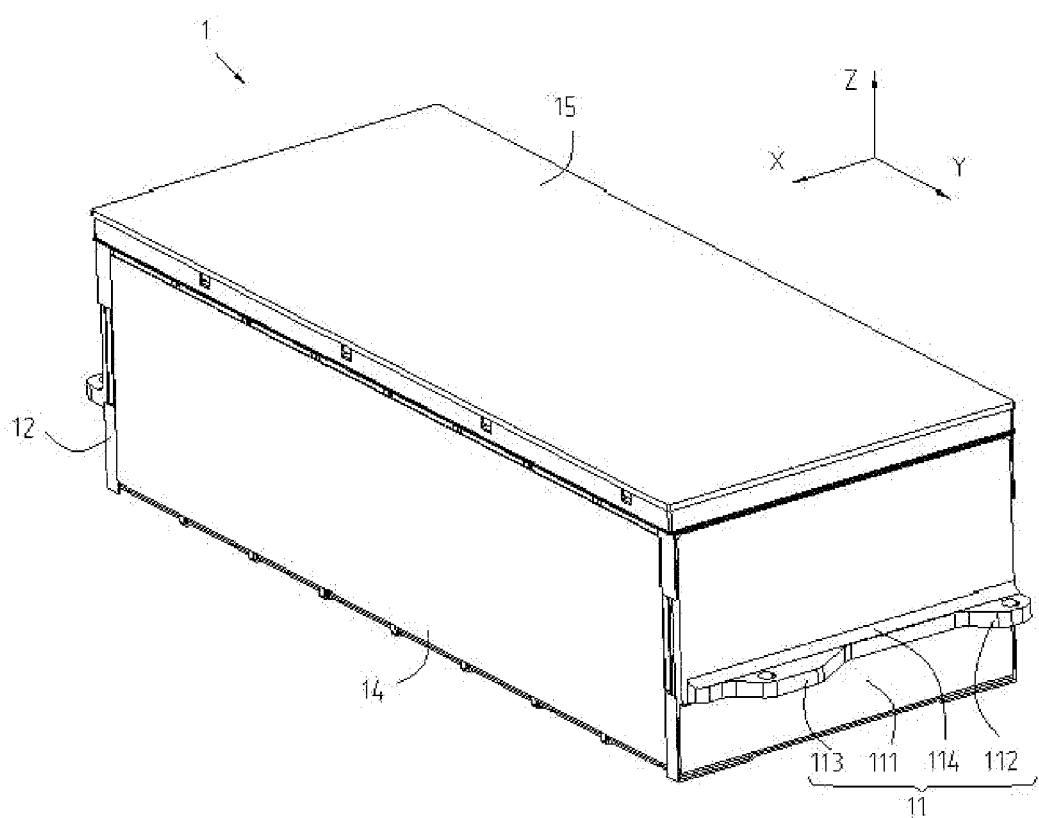
FIG. 4 is a perspective view of a battery module.
Figure 5:
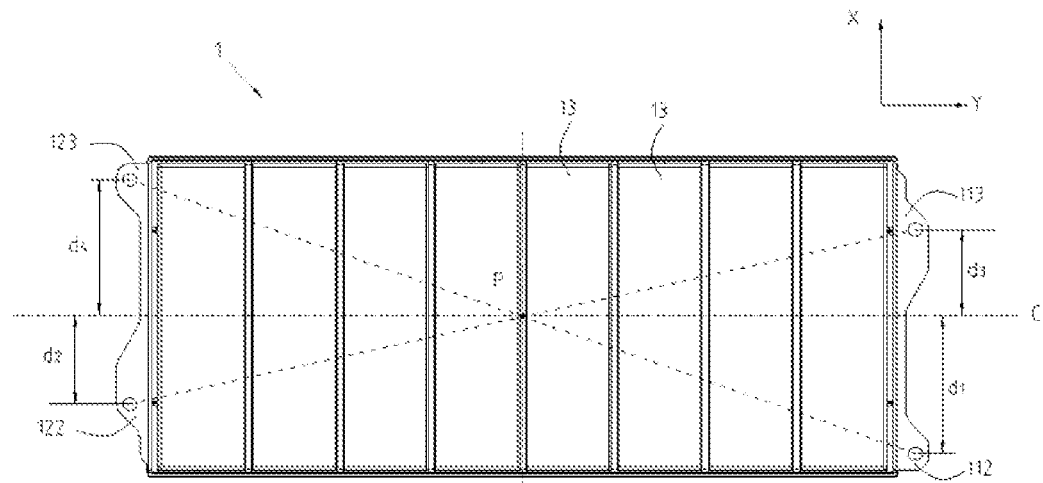
FIG. 5 is a bottom view of FIG. 4.

Referring to FIG. 4 and FIG. 5, each battery module 1 may include a plurality of batteries 13, a first end plate 11, a second end plate 12, side plates 14, and an upper cover 15.

The plurality of batteries 13 are arranged side by side along a second direction Y. The first end plate 11 and the second end plate 12 are respectively located on two sides of the plurality of batteries 13 in the second direction Y. There may be two side plates 14. The two side plates 14 are respectively located on two sides of the plurality of batteries 13 in a first direction X. The two side plates 14 may be fixedly connected to the first end plate 11 and the second end plate 12 through welding, so that the two side plates 14, the first end plate 11, and the second end plate 12 together clamp to fasten the plurality of batteries 13.

It should be noted that in this application, a strap may be selected to replace the two side plates 14. The strap may be arranged around the first end plate 11, the second end plate 12, and the plurality of batteries 13 to tighten the first end plate 11, the second end plate 12, and the plurality of batteries 13.

Referring to FIG. 4, the upper cover 15 is located above the plurality of batteries 13 and assembled to the first end plate 11, the second end plate 12, and the two side plates 14.

Referring to FIG. 4 to FIG. 8, the first end plate 11 may be provided with a first main body portion 111 and a first lug portion 112. The first lug portion 112 protrudes from the first main body portion 111 along the second direction Y, and is provided with a first mounting hole 112A. The second end plate 12 may be provided with a second main body portion 121 and a second lug portion 122. The second lug portion 122 protrudes from the second main body portion 121 along the second direction Y, and is provided with a second mounting hole 122A.

An area of a lower surface (that is, a contact surface of the first lug portion 112 with the corresponding support beam 21 of the box body 2), in a third direction Z, of the first lug portion 112 is $S_1$, a distance from a central axis of the first mounting hole 112A to a center line C, in a first direction X, of the battery module 1 is $d_1$, an area of a lower surface, in the third direction Z, of the second lug portion 122 is $S_2$, and a distance from a central axis of the second mounting hole 122A to the center line C, in the first direction X, of the battery module 1 is $d_2$, where $d_1 > d_2$, and $S_1 < S_2$.

In an assembling process of the battery pack, because $d_1 > d_2$ (in other words, the first lug portion 112 and the second lug portion 122 of each battery module 1 are in staggered arrangement in the first direction X), for the first battery module 1A and the second battery module 1B adjacently arranged in the second direction Y, the second lug portion 122 of the second end plate 12 of the first battery module 1A and the first lug portion 112 of the first end plate 11 of the second battery module 1B may be arranged side by side in the first direction X, thereby achieving jointing assembly between the adjacent battery modules 1. This assembly mode reduces a mounting clearance between the adjacent battery modules 1, thereby increasing a space utilization rate of the battery modules 1 in the box body 2, and accordingly increasing energy density of the battery pack. In addition, when two ends of each battery module 1 are respectively fastened to the box body 2 through the first mounting hole 112A and the second mounting hole 122A, because $d_1 > d_2$, to ensure a stress balance between different fastening points (based on lever principle, $F_1 d_1 = F_2 d_2$), a stress $F_1$ at the fastening point corresponding to the first mounting hole 112A is less than a stress $F_2$ at the fastening point corresponding to the second mounting hole 122A. In such case, because $F_1 < F_2$ and $S_1 < S_2$, a difference between a pressure $P_1$ ($P_1 = F_1/S_1$) applied to the first lug portion 112 and a pressure $P_2$ ($P_2 = F_2/S_2$) applied to the second lug portion 122 is reduced, and a difference between structural strength of the first lug portion 112 and structural strength of the second lug portion 122 is correspondingly reduced, thereby preventing the structural strength of the first lug portion 112 or the structural strength of the second lug portion 122 from being over-designed. This further increases the energy density of the battery pack, and ensures the fastening reliability between the battery modules 1 and the box body 2. In addition, when the battery pack is used in a vehicle, endurance mileage of the vehicle is greatly increased.

In an implementation, $0 \leq |S_1 d_1 - S_2 d_2| \leq 0.05$. In such case, because $S_1 d_1$ and $S_2 d_2$ are equal or have a small difference (due to manufacture and/or measurement error), $P_1$ and $P_2$ may be considered equal or approximately equal. Correspondingly, the structural strength of the first lug portion 112 is equal to or approximate to that of the second lug portion 122. This avoids that one of the first lug portion 112 and the second lug portion 122 fails first due to insufficient structural strength, thereby improving the fastening reliability between the battery modules 1 and the box body 2.

Figure 6:
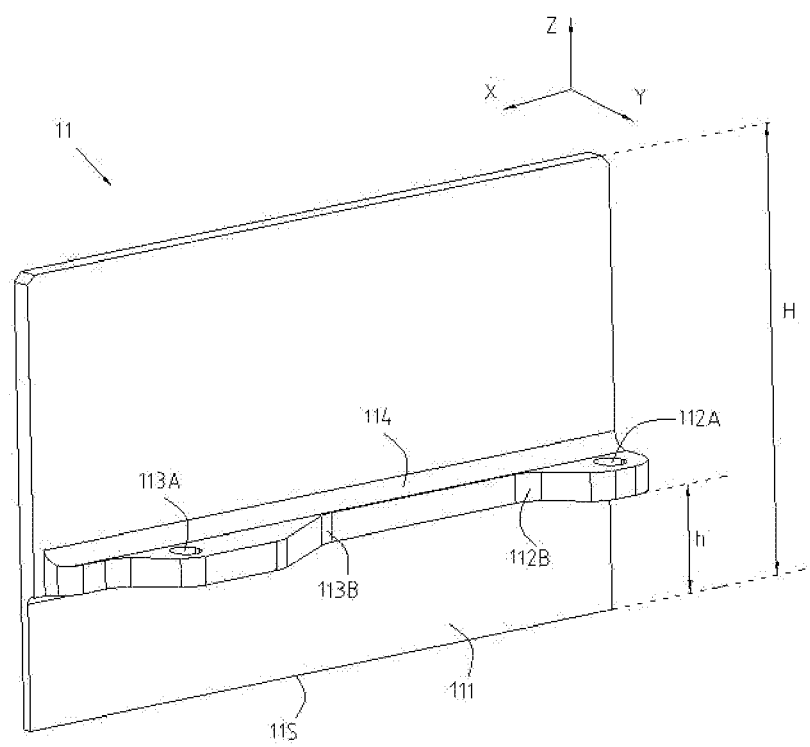
FIG. 6 is a perspective view of a first end plate in FIG. 4.

Referring to FIG. 6, the first end plate 11 may have a lower edge 11S in the third direction Z. A height of the first end plate 11 in the third direction Z is H, and a distance between the first lug portion 112 and the lower edge 11S of the first end plate 11 is h, where $H/4 \leq h \leq H/2$.

This is because, if $h > H/2$, a height of each support beam 21 inside the box body 2 is correspondingly increased. This not only increases assembly difficulty and reduces manufacturability, but also increases a weight of the box body 2, which is not conducive to improvement of the energy density of the battery pack. If $h < H/4$, because the first lug portion 112 of the first end plate 11 is reliably restricted under action of the fastening point, a top portion, away from the first lug portion 112, of the first end plate 11 is prone to a structural failure under action of an expansion force generated from the batteries when the battery module 1 is in long-term use. This is not conducive to improvement of the structural strength of the battery module 1.

A distance between the second lug portion 122 and a lower edge of the second end plate 12 is equal to the distance between the first lug portion 112 and the lower edge 11S of the first end plate 11.

Figure 7:
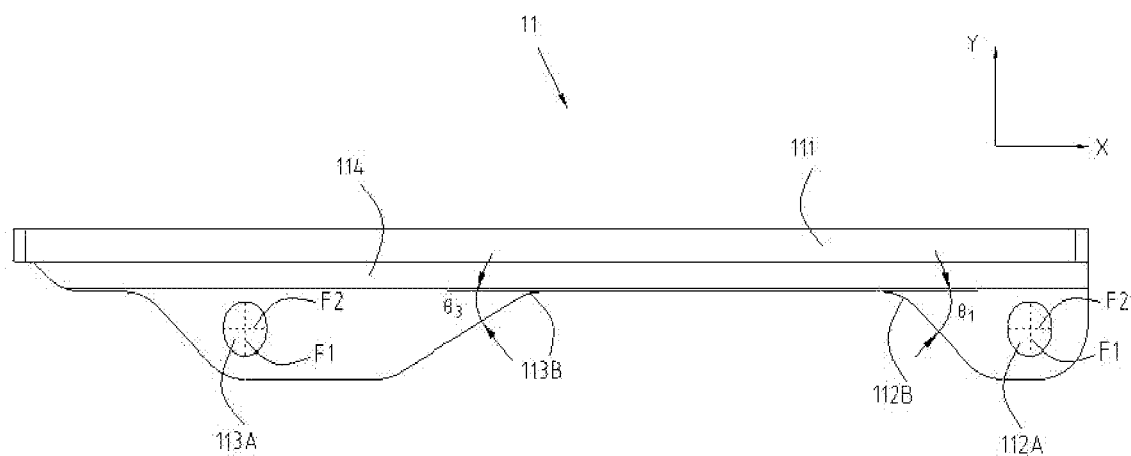
FIG. 7 is a top view of FIG. 6.

To improve the structural strength of the first end plate 11, referring to FIG. 4, FIG. 6, and FIG. 7, the first end plate 11 is further provided with a first reinforcement portion 114. The first reinforcement portion 114 is connected to the first main body portion 111 and protrudes from the first main body portion 111 along the second direction Y, and the first lug portion 112 is connected to the first reinforcement portion 114 and protrudes from the first reinforcement portion 114 along the second direction Y. In an implementation, the first reinforcement portion 114 is a continuous protruding structure stretching over the entire first main body portion 111 in the first direction X.

Figure 8:
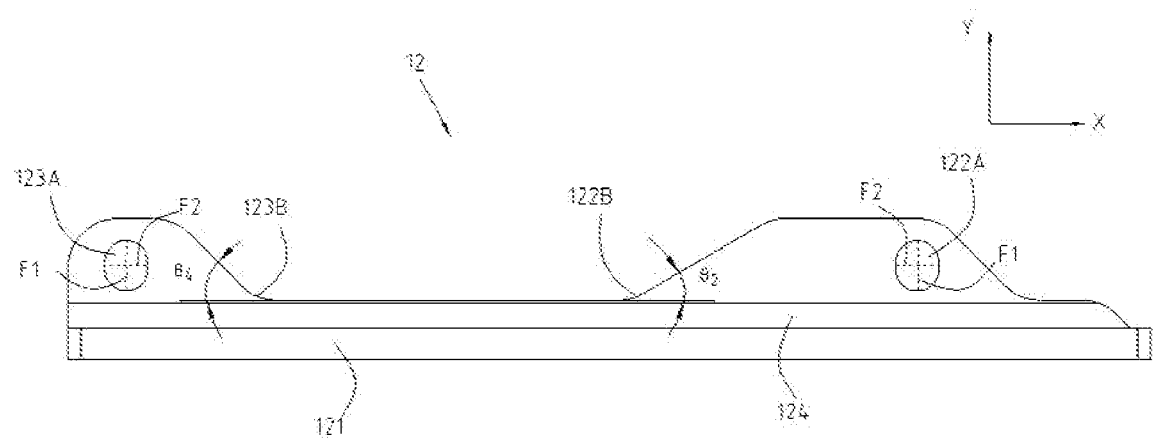
FIG. 8 is a top view of a second end plate in FIG. 4.
Reference signs are described as follows:
1. battery module
1A. first battery module
1B. second battery module
11. first end plate
111. first main body portion
112. first lug portion
112A. first mounting hole
112B. first recess face
113. third lug portion
113A. third mounting hole
113B. third recess face
114. first reinforcement portion
11S. lower edge
12. second end plate
121. second main body portion
122. second lug portion
122A. second mounting hole
122B. second recess face
123. fourth lug portion
123A. fourth mounting hole
123B. fourth recess face
124. second reinforcement portion
13. battery
14. side plate
15. upper cover
2. box body
21. support beam
C. center line
F1. major axis
F2. minor axis
X. first direction
Y. second direction
Z. third direction

Correspondingly, to improve the structural strength of the second end plate 12, referring to FIG. 8, the second end plate 12 is further provided with a second reinforcement portion 124. The second reinforcement portion 124 is connected to the second main body portion 121 and protrudes from the second main body portion 121 along the second direction Y, and the second lug portion 122 is connected to the second reinforcement portion 124 and protrudes from the second reinforcement portion 124 along the second direction Y. In an implementation, the second reinforcement portion 124 is a continuous protruding structure stretching over the entire second main body portion 121 in the first direction X.

Referring to FIG. 7, a first recess face 112B is formed at an end portion, in the first direction X, of the first lug portion 112, and the first recess face 112B is recessed to the first main body portion 111 along the second direction Y, that is, the first recess face 112B is an arc structure. Based on arrangement of the first recess face 112B, the first lug portion 112 can be connected to the first reinforcement portion 114 through the arc structure, so that a problem of concentrated stress during assembling is avoided.

In an implementation, an acute angle formed between a tangent direction of the first recess face 112B and the first direction X is $\theta_1$, where $\theta_1 \leq 45°$. This is because, during long-term use of the battery module 1, a junction between the first lug portion 112 and the first reinforcement portion 114 is a weak area, the first end plate 11 also deforms under action of an expansion force when the batteries in the battery module 1 expand and deform. In such case, if $\theta_1$ is too large, a stress on the end portion, in the first direction X, of the first lug portion 112 may exceed yield strength of a material of the first end plate 11, causing damage to the first end plate 11.

Correspondingly, a second recess face 122B is formed at an end portion, in the first direction X, of the second lug portion 122, and the second recess face 122B is recessed to the second main body portion 121 along the second direction Y. In an implementation, an acute angle formed between a tangent direction of the second recess face 122A and the first direction X is $\theta_2$, where $\theta_2 \leq 45°$.

In an embodiment not shown, the first lug portion 112 and the second lug portion 122 may be located on two sides of the center line C of the battery module 1 in the first direction X, that is, the first lug portion 112 and the second lug portion 122 are diagonally arranged. In such case, to ensure the fastening reliability of the battery module 1, a line between centers of the first mounting hole 112A and the second mounting hole 122A is required to pass through a gravity center P of the battery module 1. In other words, the gravity center P of the battery module 1 may be or be approximately regarded as a geometric center of the battery module 1.

In another implementation, referring to FIG. 5, the first lug portion 112 and the second lug portion 122 may be located on the same side of the center line C of the battery module 1 in the first direction X. In such case, the first end plate 11 is further provided with a third lug portion 113. The third lug portion 113 protrudes from the first main body portion 111 along the second direction Y, and is provided with a third mounting hole 113A. The third lug portion 113 and the first lug portion 112 are respectively located on two sides of the center line C of the battery module 1 in the first direction X. The second end plate 12 is further provided with a fourth lug portion 123. The fourth lug portion 123 protrudes from the second main body portion 121 along the second direction Y, and is provided with a fourth mounting hole 123A. The fourth lug portion 123 and the second lug portion 122 are respectively located on two sides of the center line C of the battery module 1 in the first direction X. An area of a lower surface, in the third direction Z, of the third lug portion 113 is $S_3$, a distance from a central axis of the third mounting hole 113A to a center line, in the first direction X, of the first end plate 11 is $d_3$, an area of a lower surface of the fourth lug portion 123 is $S_4$, and a distance from a central axis of the fourth mounting hole 123A to a center line, in the first direction X, of the second end plate 12 is $d_4$, where $d_3 < d_4$ (in other words, the third lug portion 113 and the fourth lug portion 123 of each battery module 1 are in staggered arrangement in the first direction X), and $S_3 > S_4$.

In a grouping process of the battery pack, because $d_1 > d_2$ and $d_3 < d_4$, for the first battery module 1A and the second battery module 1B adjacently arranged in the second direction Y, the first lug portion 112 of the first battery module 1A, the second lug portion 122 of the second battery module 1B, the third lug portion 113 of the first battery module 1A, and the fourth lug portion 123 of the second battery module 1B may be sequentially arranged side by side in the first direction X (as shown in FIG. 3), thereby achieving the jointing assembly between the adjacent battery modules 1. This assembly mode reduces a mounting clearance between the adjacent battery modules 1, thereby increasing a space utilization rate of the battery modules 1 in the box body 2, and accordingly increasing energy density of the battery pack.

When two ends of each battery module 1 are fastened to the box body 2 through the first mounting hole 112A, the second mounting hole 122A, the third mounting hole 113A, and the fourth mounting hole 123A, because $d_3<d_4$, to ensure a stress balance between a fastening point corresponding to the third mounting hole 113A and a fastening point corresponding to the fourth mounting hole 123A (based on the lever principle, $F_3d_3=F_4d_4$) a stress $F_3$ at the fastening point corresponding to the third mounting hole 113A is greater than a stress $F_4$ at the fastening point corresponding to the fourth mounting hole 123A. In such case, because $F_4<F_3$ and $S_3>S_4$, a difference between a pressure $P_3$ ($P_3=F_3/S_3$) applied to the third lug portion 113 and a pressure $P_4$ ($P_4=F_4/S_4$) applied to the fourth lug portion 123 is reduced, and a difference between structural strength of the third lug portion 113 and structural strength of the fourth lug portion 123 is correspondingly reduced, thereby preventing the structural strength of the third lug portion 113 or the structural strength of the fourth lug portion 123 from being over-designed. This further increases the energy density of the battery pack, and ensures the fastening reliability between the battery modules 1 and the box body 2.

In an assembling process of the battery pack, the fastening point corresponding to the first mounting hole 112A and the fastening point corresponding to the third mounting hole 113A are required to satisfy the stress balance (based on the level principle, $F_3d_3=F_1d_1$). Therefore, to ensure that a pressure $P_1$ applied to the first lug portion 112 of the first end plate 11 is equal to or approximate to a pressure $P_3$ applied to the third lug portion 113 to keep the structural strength of the first lug portion 112 and the structural strength of the third lug portion 113 consistent or substantially consistent, then $0 \leq |S_3d_3 - S_1d_1| \leq 0.05$. In addition, for the first end plate 11 of the battery module 1, $S_3$ may be reduced by increasing $d_3$ when $d_1$ and $S_1$ of the first lug portion 112 are determined, helping to reduce a weight of the first end plate 11.

Correspondingly, in the assembling process of the battery pack, the fastening point corresponding to the second mounting hole 122A and the fastening point corresponding to the fourth mounting hole 123A are also required to satisfy the stress balance (based on the level principle, $F_4d_4=F_2d_2$). Therefore, to ensure that a pressure $P_2$ applied to the second lug portion 122 of the second end plate 12 and a pressure $P_4$ applied to the fourth lug portion 123 are equal or approximately equal to keep the structural strength of the second lug portion 122 and the structural strength of the fourth lug portion 123 consistent or substantially consistent, then $0 \leq |S_4d_4 - S_2d_2| \leq 0.05$. In addition, for the second end plate 12 of the battery module 1, $S_4$ may be reduced by increasing $d_4$ when $d_2$ and $S_2$ of the second lug portion 122 are determined, helping to reduce a weight of the second end plate 12.

In an implementation, $0 \leq |S_3d_3 - S_4d_4| \leq 0.05$. In such case, the first lug portion 112, the second lug portion 122, the third lug portion 113, and the fourth lug portion 123 keep consistent or substantially consistent in structural strength. This avoids that failures occur first at positions of some fastening points due to insufficient structural strength, greatly improving the fastening reliability between the battery modules 1 and the box body 2.

To ensure that the first lug portion 112 and the fourth lug portion 123 are structurally consistent, $d_3=d_2$ and $S_3=S_2$; moreover, to ensure that the third lug portion 113 and the second lug portion 122 are structurally consistent, $d_4=d_1$; and $S_4=S_1$. Therefore, the first end plate 11 and the second end plate 12 are exactly the same in structure, thereby reducing types of parts and lowering manufacturing cost.

Referring to FIG. 7, a third recess face 113B is formed at an end portion, in the first direction X, of the third lug portion 113, and the third recess face 113B is recessed to the first main body portion 111 along the second direction Y. That is, the third recess face 113B is an arc structure. Based on arrangement of the third recess face 113B, the third lug portion 113 can be connected to the second reinforcement portion 124 through the arc structure, so that the problem of concentrated stress during assembling is avoided.

In one embodiment, an acute angle formed between a tangent direction of the third recess face 113B and the first direction X is $\theta_3$, where $\theta_3 \leq 45°$. This is because, during long-term use of the battery module 1, a junction between the third lug portion 113 and the first reinforcement portion 114 is a weak area, the first end plate 11 also deforms under action of an expansion force when the batteries in the battery module 1 expand and deform. In such case, if $\theta_3$ is too large, a stress on the end portion, in the first direction X, of the third lug portion 113 may exceed the yield strength of the material of the first end plate 11, causing damage to the first end plate 11.

Correspondingly, referring to FIG. 8, a fourth recess face 123B is formed at an end portion, in the first direction X, of the fourth lug portion 123, and the fourth recess face 123B is recessed to the second main body portion 121 along the second direction Y. In one embodiment, an acute angle formed between a tangent direction of the fourth recess face 123B and the first direction X is $\theta_4$, where $\theta_4 \leq 45°$.

Referring to FIG. 3, for the first battery module 1A and the second battery module 1B adjacently arranged in the second direction Y, the third lug portion 113 of the first battery module 1A and the second lug portion 122 of the second battery module 1B may be arranged at an interval in the first direction X, and a distance between the two is D. To facilitate assembling of the first battery module 1A and the second battery module 1B, In one embodiment, $D \geq 5$ mm.

After the first battery module 1A and the second battery module 1B are assembled, the first lug portion 112 of the first battery module 1A and the second lug portion 122 of the second battery module 1B abut against each other. When the battery pack sways, the first lug portion 112 and the second lug portion 122 provide interaction force to each other, helping to improve the fastening reliability between the battery modules 1 and the box body 2.

Correspondingly, after the first battery module 1A and the second battery module 1B are assembled, the third lug portion 113 of the first battery module 1A and the fourth lug portion 123 of the second battery module 1B abut against each other.

Each battery module 1 is fastened to the box body 2 through the first mounting hole 112A, the second mounting hole 122A, the third mounting hole 113A, and the fourth mounting hole 123A by corresponding fasteners. The first mounting hole 112A, the second mounting hole 122A, the third mounting hole 113A, and the fourth mounting hole 123A each may be formed as a kidney-shaped hole. The kidney-shaped hole has a major axis F1 parallel to the second direction Y and a minor axis F2 parallel to the first direction X. In this case, an elongated hole may provide a moving space for the corresponding fastener in the second direction Y. This allows an assembling tolerance of the battery module 1 to be absorbed in time during assembling, and avoids failure in fastening the battery module 1 due to expansion of the batteries during long-term use.

What is claimed is:

1. A battery module, comprising: a plurality of batteries, a first end plate, and a second end plate, wherein the first end plate and the second end plate are respectively located on two sides of the plurality of batteries in a second direction;
    the first end plate is provided with a first main body portion and a first lug portion, wherein the first lug portion protrudes from the first main body portion along the second direction, and is provided with a first mounting hole;
    the second end plate is provided with a second main body portion and a second lug portion, wherein the second lug portion protrudes from the second main body portion along the second direction, and is provided with a second mounting hole; and
    an area of a lower surface, in a third direction, of the first lug portion is $S_1$, a distance from a central axis of the first mounting hole to a center line, in a first direction, of the battery module is $d_1$, an area of a lower surface, in the third direction, of the second lug portion is $S_2$, and a distance from a central axis of the second mounting hole to the center line, in the first direction, of the battery module is $d_2$, wherein $d_1>d_2$, and $S_1<S_2$.

2. The battery module according to claim 1, wherein $0\leq|S_1d_1-S_2d_2|\leq0.05$.

3. The battery module according to claim 1, wherein
    the first end plate has a lower edge in the third direction; and
    a height of the first end plate in the third direction is H, and a distance between the first lug portion and the lower edge of the first end plate is h, wherein $H/4\leq h\leq H/2$.

4. The battery module according to claim 1, wherein a first recess face is formed at an end portion of the first lug portion, and the first recess face is recessed to the first main body portion along the second direction.

5. The battery module according to claim 4, wherein an acute angle formed between a tangent direction of the first recess face and the first direction is $\theta_1$, wherein $\theta_1\leq45°$.

6. The battery module according to claim 1, wherein
    the first end plate is further provided with a first reinforcement portion, and the first reinforcement portion is connected to the first main body portion and protrudes from the first main body portion along the second direction; and
    the first lug portion is connected to the first reinforcement portion and protrudes from the first reinforcement portion along the second direction.

7. The battery module according to claim 1, wherein the first mounting hole and the second mounting hole are kidney-shaped holes, and major axes of the kidney-shaped holes are parallel to the second direction.

8. The battery module according to claim 1, wherein
    the first lug portion and the second lug portion are located on the same side of the center line of the battery module in the first direction;
    the first end plate is further provided with a third lug portion, the third lug portion protrudes from the first main body portion along the second direction and is provided with a third mounting hole, and the third lug portion and the first lug portion are respectively located on two sides of the center line of the battery module in the first direction;
    the second end plate is further provided with a fourth lug portion, the fourth lug portion protrudes from the second main body portion along the second direction and is provided with a fourth mounting hole, and the fourth lug portion and the second lug portion are respectively located on two sides of the center line of the battery module in the first direction; and
    an area of a lower surface, in the third direction, of the third lug portion is $S_3$, a distance from a central axis of the third mounting hole to a center line, in the first direction, of the first end plate is $d_3$, an area of a lower surface of the fourth lug portion is $S_4$, and a distance from a central axis of the fourth mounting hole to a center line, in the first direction, of the second end plate is $d_4$, wherein $d_3<d_4$, and $S_3>S_4$.

9. The battery module according to claim 8, wherein $0\leq|S_3d_3-S_4d_4|\leq0.05$, and $0\leq|S_4d_4-S_2d_2|\leq0.05$.

10. The battery module according to claim 9, wherein $0\leq|S_3d_3-S_4d_4|\leq0.05$.

11. The battery module according to claim 8, wherein
    $d_3=d_2$, and $S_3=S_2$; and
    $d_4=d_1$, and $S_4=S_1$.

12. The battery module according to claim 8, wherein
    a third recess face is formed at an end portion, in the first direction, of the third lug portion, and the third recess face is recessed to the first main body portion along the second direction; and
    a fourth recess face is formed at an end portion, in the first direction, of the fourth lug portion, and the fourth recess face is recessed to the second main body portion along the second direction.

13. The battery module according to claim 12, wherein
    an acute angle formed between a tangent direction of the third recess face and the first direction is $\theta_3$, wherein $\theta_3\leq45°$; and
    an acute angle formed between a tangent direction of the fourth recess face and the first direction is $\theta_4$, wherein $\theta_4\leq45°$.

14. A battery pack, comprising a box body, and a plurality of the battery modules;
    wherein each battery module comprises:
    a plurality of batteries, a first end plate, and a second end plate, wherein the first end plate and the second end plate are respectively located on two sides of the plurality of batteries in a second direction;
    the first end plate is provided with a first main body portion and a first lug portion, wherein the first lug portion protrudes from the first main body portion along the second direction, and is provided with a first mounting hole;
    the second end plate is provided with a second main body portion and a second lug portion, wherein the second lug portion protrudes from the second main body portion along the second direction, and is provided with a second mounting hole; and
    an area of a lower surface, in a third direction, of the first lug portion is $S_1$, a distance from a central axis of the first mounting hole to a center line, in a first direction, of the battery module is $d_1$, an area of a lower surface, in the third direction, of the second lug portion is $S_2$, and a distance from a central axis of the second mounting hole to the center line, in the first direction, of the battery module is $d_2$, wherein $d_1>d_2$, and $S_1<S_2$; and
    wherein the each battery module is fastened to the box body through the first mounting hole and the second mounting hole; and
    the plurality of battery modules comprise a first battery module and a second battery module, and the first lug portion of the first end plate of the first battery module and the second lug portion of the second end plate of the second battery module are arranged side by side in the first direction.

15. The battery pack according to claim 14, wherein $0 \leq |S_1d_1 - S_2d_2| \leq 0.05$.

16. The battery pack according to claim 14, wherein
the first lug portion and the second lug portion are located on the same side of the center line of the battery module in the first direction;
the first end plate is further provided with a third lug portion, the third lug portion protrudes from the first main body portion along the second direction and is provided with a third mounting hole, and the third lug portion and the first lug portion are respectively located on two sides of the center line of the battery module in the first direction;
the second end plate is further provided with a fourth lug portion, the fourth lug portion protrudes from the second main body portion along the second direction and is provided with a fourth mounting hole, and the fourth lug portion and the second lug portion are respectively located on two sides of the center line of the battery module in the first direction; and
an area of a lower surface, in the third direction, of the third lug portion is $S_3$, a distance from a central axis of the third mounting hole to a center line, in the first direction, of the first end plate is $d_3$, an area of a lower surface of the fourth lug portion is $S_4$, and a distance from a central axis of the fourth mounting hole to a center line, in the first direction, of the second end plate is $d_4$, wherein $d_3 < d_4$, and $S_3 > S_4$; and
wherein the each battery module is fastened to the box body through the first mounting hole, the second mounting hole, the third mounting hole, and the fourth mounting hole; and
the plurality of battery modules comprise a first battery module and a second battery module, and the first lug portion of the first battery module, the second lug portion of the second battery module, the third lug portion of the first battery module, and the fourth lug portion of the second battery module are sequentially arranged side by side in the first direction.

17. The battery pack according to claim 16, wherein the third lug portion of the first battery module and the second lug portion of the second battery module are arranged at an interval in the first direction.

18. The battery pack according to claim 16, wherein $0 \leq |S_3d_3 - S_1d_1| \leq 0.05$, and $0 \leq |S_4d_4 - S_2d_2| \leq 0.05$.

19. The battery pack according to claim 16, wherein $d_3 = d_2$, and $S_3 = S_2$; and
$d_4 = d_1$, and $S_4 = S_1$.

20. A vehicle, comprising: a battery pack,
wherein the battery pack comprising a box body, and a plurality of the battery modules;
wherein each battery module comprises:
a plurality of batteries, a first end plate, and a second end plate, wherein the first end plate and the second end plate are respectively located on two sides of the plurality of batteries in a second direction;
the first end plate is provided with a first main body portion and a first lug portion, wherein the first lug portion protrudes from the first main body portion along the second direction, and is provided with a first mounting hole;
the second end plate is provided with a second main body portion and a second lug portion, wherein the second lug portion protrudes from the second main body portion along the second direction, and is provided with a second mounting hole; and
an area of a lower surface, in a third direction, of the first lug portion is $S_1$, a distance from a central axis of the first mounting hole to a center line, in a first direction, of the battery module is $d_1$, an area of a lower surface, in the third direction, of the second lug portion is $S_2$, and a distance from a central axis of the second mounting hole to the center line, in the first direction, of the battery module is $d_2$, wherein $d_1 > d_2$, and $S_1 < S_2$; and
wherein the each battery module is fastened to the box body through the first mounting hole and the second mounting hole; and
the plurality of battery modules comprise a first battery module and a second battery module, and the first lug portion of the first end plate of the first battery module and the second lug portion of the second end plate of the second battery module are arranged side by side in the first direction.

* * * * *